United States Patent [19]

Mukaemachi et al.

[11] 4,264,895
[45] Apr. 28, 1981

[54] MULTI-STAGE SWITCHING NETWORK CONTROLLED BY AT LEAST THREE LOGICAL INPUTS

[75] Inventors: Takuji Mukaemachi; Tetsuo Takeshita, both of Yokohama; Keiichi Shimizu, Higashikurume; Ryoichi Himeno, Iruma, all of Japan

[73] Assignees: Nippon Telegraph and Telephone Public Corp.; Hitachi, Ltd., both of Tokyo, Japan

[21] Appl. No.: 16,824

[22] Filed: Mar. 2, 1979

[30] Foreign Application Priority Data

Mar. 3, 1978 [JP] Japan .................... 53-23458

[51] Int. Cl.³ .................. H04Q 9/00; H03Q 3/50
[52] U.S. Cl. ..................... 340/166 R; 179/18 GF
[58] Field of Search ............ 340/166 R; 179/15 R, 179/15 A, 15 AT, 18 GF, 18 GE

[56] References Cited

U.S. PATENT DOCUMENTS

| | | | |
|---|---|---|---|
| 3,609,661 | 9/1971 | Hennes et al. | 340/166 |
| 3,832,495 | 8/1974 | Hovagimyan et al. | 179/18 GF |
| 3,936,612 | 2/1976 | Hjortendal et al. | 340/166 S |
| 4,031,413 | 6/1977 | Ohhinata et al. | 307/238 |
| 4,068,215 | 1/1978 | Mukaemachi et al. | 340/166 R |

Primary Examiner—Donald J. Yusko
Attorney, Agent, or Firm—Craig and Antonelli

[57] ABSTRACT

A multi-stage switching network comprises a plurality of unitary switch matrices each including a number of cross-point circuits each of which in turn includes a memory circuit operatively connected to the associated cross-point switches in a speech path. The plurality of the unitary switch matrices are arranged in a matrix array in which each stage of the multi-stage switching network is constituted by the unitary switch matrices arrayed in at least one column thereof and interconnected through links. The memory circuit for performing ON/OFF control of the associated cross-point switches in each of the switch matrices incorporates therein at least three logical control signal input terminals to which at least an information signal for designating the switch matrix to be selected and information signals for designating a row and a column in the selected switch matrix are applied, the latter information signals being produced in common to all the switch matrices, whereby a given cross-point determined by these information signals in the selected matrix is selected and correspondingly controlled. The ON/OFF control of the cross-point switch is effected sequentially by a stage selecting information signal from stage to stage.

15 Claims, 8 Drawing Figures

| INPUT | | | | OUTPUT |
|---|---|---|---|---|
| SS | Y | X | DATA | $Qt_{N+1}$ |
| 1 | 1 | 1 | 1 | ON |
| 1 | 1 | 1 | 0 | OFF |
| 0 | $\phi$ | $\phi$ | $\phi$ | $Qt_N$ |
| $\phi$ | 0 | $\phi$ | $\phi$ | $Qt_N$ |
| $\phi$ | $\phi$ | 0 | $\phi$ | $Qt_N$ |

$\phi$ : 1 OR 0

MULTI-STAGE SWITCHING NETWORK CONTROLLED BY AT LEAST THREE LOGICAL INPUTS

BACKGROUND OF THE INVENTION

1. Field of the Invention

The present invention relates to a driving control system for a switching network of an exchange such as a telephone exchange in which semiconductor switch elements are employed for linking the outgoing and incoming speech path lines. More particularly, the invention concerns a driving control system for a multi-stage switching network in which a plurality of switch matrices each including a number of cross-point circuits arranged in a matrix array each of which in turn includes a storage cell for storing therein an information signal for opening or closing the associated cross-point switches in a speech path and a control input circuit for controlling the information signal stored in the storage cell by at least three logical inputs.

2. Description of the Prior Art

The conventional switching network as represented by a telephone exchange employs mechanical-contact cross-point switches such as reed relays and cross-bar switches. With the recent marked development of semiconductor technology, however, a semiconductor cross-point switch has come into practical use. As compared with the hitherto known electromagnetic cross-point switch which requires a high power of several hundred milli-watts to several ten watts for the operation thereof, the control signal for the switching network using the semiconductor elements as the cross-point switches may be a logical pulse signal of a significantly reduced magnitude on the order of several volts or several milli-amperes which permits nevertheless an enhanced high-speed operation of the switching network.

However, the use of the semiconductor cross-point switch elements in turn means that the noise immunity of the switching network is correspondingly lowered, involving possibly erroneous operations.

In general, because the switching network employs an enormous number of cross-point switches arrayed in a predetermined number of matrices each having m rows and n columns (i.e. m×n cross-points) which matrices are then grouped into a plurality of stages and interconnected through link connections, a correspondingly large space is required for the installation. Further, a remarkably large number of control line wires is required to selectively drive the cross-point in the switch matrices the number of which usually amounts from several tens to several hundreds. Under these conditions, when a general purpose IC logic circuit such as TTL logical circuits is employed for the control input circuit for receiving a command information signal to close or open the corresponding semiconductor cross-point switch element, the unitary control range of a switch controller for driving and controlling the switching network has to be limited to a small extent in consideration of the required noise immunity as well as the wire length. For example, the switch controller will have to be provided for every switch stage thereby to limit the wire length to less than several ten centimeters. Further, in order to assure a stabilized signal transmission, each of the switch packages has to be provided with a buffer gate circuit for receiving the control signals. It goes without saying that the provision of TTL logic circuit together with a holding circuit such as a flip-flop in correspondence to the cross-point is undesirable from the economical standpoint and also in view of expensive packing processes. In brief, although the switching network employing the semiconductor cross-point switch elements allows the logic pulse signal to be utilized as the control signal, significant reduction in the amount of hardware as well as simplification of the manufacturing process has not yet been attained, which provides an obstacle in promoting economical fabrication of the switching network.

SUMMARY OF THE INVENTION

An object of the present invention is to provide a multi-stage switching network which can be implemented economically in a compact structure with a significantly reduced quantity of the hardware and wiring for the control lines.

Another object of the invention is to provide a multi-stage switching network which exhibits an improved noise immunity and an enhanced reliability in operation.

Still another object of the invention is to provide a multi-stage switching network which allows the wiring and packing processes to be effectively simplified while decreasing the number of the wiring steps.

A further object of the invention is to provide a multi-stage switching network, the power consumption of which is significantly reduced.

A still further object of the invention is to provide a multi-stage switching network which can be controlled in a simple and convenient manner.

In view of the above and other objects which will become more apparent as description proceeds, there is proposed according to an aspect of the invention a multi-stage switching network which includes a plurality of unitary or elementary switch matrices arrayed in a plurality of linked stages, each of the unitary switch matrices including a plurality of cross-points arrayed in a predetermined matrix array. In correspondence to each of the cross-points, a memory circuit having at least three logic control input terminals is provided. The memory circuit may be composed of a transistor having a base and an emitter connected to the control input terminals and a collector connected to a storage cell for storing an information signal to control the associated cross-point switch. First, second and third control means are provided in correspondence to the rows, columns of the unitary switch matrix and the unitary switch matrices for supplying informations designating the row, the column and the matrix to be selected to the first, second and third input terminals, respectively, in common to all the cross-points, belonging to the same state. Information designating the stage to be selected is utilized for controlling sequentially a given or selected cross-point in a given stage on a time-serial base.

DETAILED DESCRIPTION OF THE PREFERRED EMBODIMENTS

Figure 1:
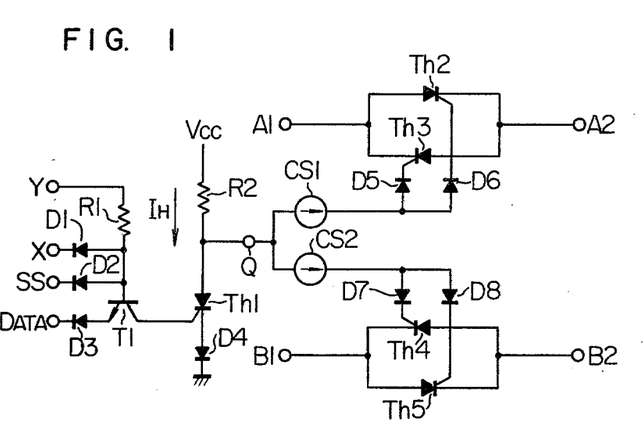
FIG. 1 is a circuit diagram for illustrating an exemplary embodiment of a single cross-point circuit arrangement which includes a memory circuit for controlling an associated semiconductor speech path switch with the aid of four logic input signals.
Figure 2:
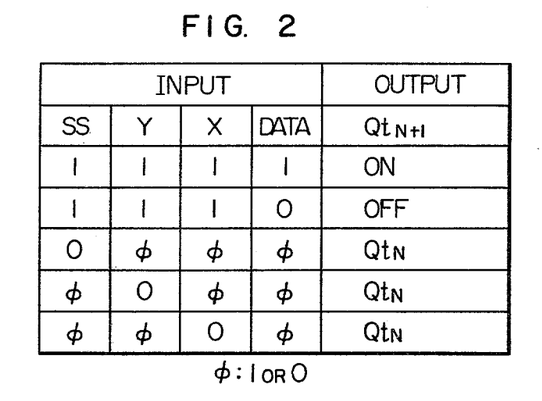
FIG. 2 shows a truth table for illustrating operations of a memory circuit having four control inputs according to the teaching of the invention.

FIG. 1 shows a circuit diagram of a single cross-point circuit arrangement constituting only a part of a switch matrix to which the present invention can be applied. In the figure, symbols X, Y, SS and DATA denote logic input terminals among which the terminals X and Y are destined to select a row and a column, respectively, in the switch matrix thereby to identify a corresponding cross-point, the terminal SS is adapted to be supplied with the input signal for selecting an elementary or unitary switch matrix in a matrix array constituted by a plurality of the unitary matrices, and the terminal DATA serves as an input terminal for supplying ON/OFF information signal to associated cross-point switches. Further, reference symbols A1 and B1 denote input terminals connected to speech paths, while A2 and B2 designate the output terminals for the speech paths. The illustrated cross-point circuit arrangement comprises a control input circuit, a storage cell, a speech path switching circuit and constant current supply sources CS1 and CS2. More specifically, the control input circuit is composed of level shifting diodes D1, D2 and D3, a transistor T1 and a resistor R1. The storage cell includes a thyristor Th1, a diode D4 and a resistor R2. The speech path switching circuit includes thyristors Th2 to Th5 and a reverse-current blocking diodes D5 to D8. The constant current supply sources CS1 and CS2 serve to supply a drive current to the thyristors Th2 to Th5. Reference symbol Q denotes an output terminal of a memory circuit constituted by the control input circuit and the storage cell. The memory circuit operates in accordance with the contents listed in the truth table shown in FIG. 2. In other words, when all the terminals X, Y and SS are supplied with the input signal of logic "1", the diodes D1 and D2 are biased reversely or backwardly, resulting in the transistor T1 being turned on by the current supplied to the base thereof through the resistor R1. Thus, the memory circuit is in the state to allow information or data to be written in the storage cell. Under the condition, if the signal of logic "1" is applied to the data terminal DATA, the base current will then flow through the base-collector path of the transistor T1 to the gate electrode of the thyristor Th1, which is thus turned on. Consequently, a holding current $I_H$ flows from the power supply source $V_{cc}$ through the resistor R2, the thyristor Th1 and the diode D4 to the ground, as a result of which the self-holding of the thyristor Th1 in the conductive state can be attained. In the conducting state of the thyristor Th1, the constant current supply sources CS1 and CS2 operate to supply a constant current to the gate electordes of the associated thyristors Th2; Th3 and Th4; Th5 through the diodes D5; D6 and D7; D8, correspondingly and respectively. Thus, the one of the thyristors Th2 and Th3 which has a lower potential at the cathode electrode is fired. The same applies to the thyristor Th4 or Th5.

On the other hand, when logic "0" signal is applied to the data terminal DATA with all the other input terminals X, Y and SS being concurrently supplied with the input signals of the logic "0" level, the transistor T1 is biased forwardly to extract the self-holding current $I_H$ to the terminal DATA from the gate electrode of the thyristor Th1, resulting in the thyristor Th1 being turned off with the transistor T1 being simultaneously reset to the inoperative state. Under the condition, the constant current supply sources CS1 and CS2 are inhibited from operation. Thus, the thyristors Th2 and Th3 and Th4 or Th5 can be turned off to be reset to the starting state by cutting off the d.c. bias currents between the terminals A1 and A2 and between the terminals B1 and B2 by appropriate switch means.

When any one of the input terminals X, Y and SS is supplied with the input signal of logic "0" regardless of the logical value of the input information to the data terminal DATA, no write-in operation to the storage cell including the thyristor Th1 is allowed because of the absence of the base current supplied to the transistor T1. In this connection, it will be noted that the electric power consumption at the control input circuit becomes equal to zero, when the control input signal to the terminal Y is logic "0". In combination with this feature, the storage cell including the thyristor Th1, which is usually a semiconductor element of four-layered PNPN semiconductor structure, consumes no electric energy in the non-conducting state. In this manner, a memory circuit exhibiting a very low power consumption characteristic has been accomplished.

Further, with the arrangement described above, no gate circuit is required by virtue of the provision of the input terminals X, Y, SS and DATA for every cross-point, while the ON/OFF controls of the cross-point switches can be effected independently from one another in a matrix array including a plurality of such cross-point circuits. It should be mentioned here that the data input terminal DATA may be spared and the input terminal X, for example, may be connected to the emitter of the transistor T1. However, in this case, the turning-on control for a certain cross-point switch in a matrix array will bring about the turning-off operation for the other cross-point switches connected to the same column of the matrix array as the above certain cross-point switch, a disadvantage in that it makes impractical the interrupt connection or the like.

Figure 3:
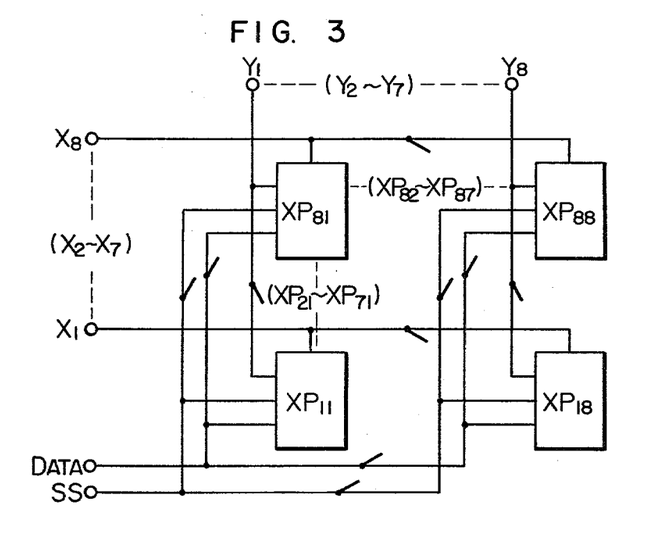
FIG. 3 is a block diagram showing a circuit arrangement of a unitary or elementary switch matrix of 8×8 in row and column constituted by a corresponding number of cross-point circuits each provided with the memory circuit having four input terminals.

FIG. 3 shows in a block diagram a component or unitary switch matrix circuit composed of the cross-point circuits shown in FIG. 1 and arrayed in a matrix configuration of 8 rows and 8 columns (i.e. 8×8 cross-points). Illustration of some details such as the speech paths is omitted for the sake of simplification. In this figure, $XP_{11}$ to $XP_{88}$ represent the cross-point circuits. The input terminals X of the individual cross-point circuits $XP_{11}$ to $XP_{88}$ are separately provided in a multiple connection for every row of the matrix to serve as the row selecting terminals indicated by $X_1, \ldots, X_8$. The input terminals Y are also separately provided in a multiple connection for every column to serve as the column selecting terminals $Y_1, \ldots, Y_8$. On the other hand, the unitary matrix selecting input terminal SS is provided in common for all the cross-point circuits $XP_{11}, \ldots, XP_{88}$ and connected in common to the terminal SS shown in FIG. 1. The same applies to the data input terminal which is connected in common to all the terminals DATA (FIG. 1) of the individual cross-point circuits $XP_{11}, \ldots, XP_{88}$. With this arrangement, when any given one of the row terminals $X_1$ to $X_8$ together with any one of the column terminals $Y_1$ to $Y_8$ are supplied with the input signals of the logic "1" level with the terminal SS being concurrently supplied with logic "1", one corresponding cross-point circuit in the matrix is definitely selected and can be controlled to the ON or conducting state or nonconducting (OFF) state by applying logic "1" or "0" signal to the terminal DATA.

Figure 4:
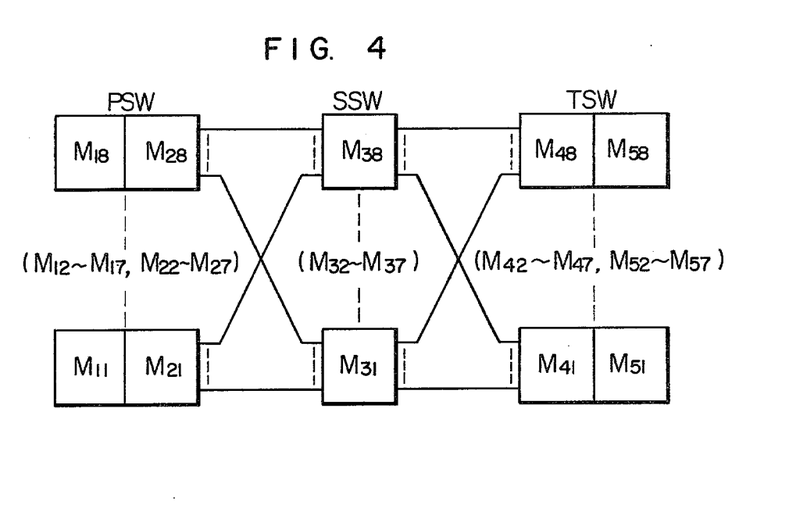
FIG. 4 is a block diagram showing schematically a general arrangement of a multi-stage switching network implemented at three stages each including a number of the switch matrices having 8×8 cross-points.

FIG. 4 shows schematically an exemplary arrangement of a switching network constituted by a plurality of the matrix switch circuits described above and implemented in three stages through link connection. In the figure, $M_{11}$ to $M_{58}$ represent, respectively, the unitary switch matrices of the same structure as the one shown in FIG. 3. A primary switch stage PSW is composed of the unitary switch matrices $M_{11}$ to $M_{28}$. The outgoing lines for the speech paths of the switch matrices $M_{1i}$ ($i=1, \ldots, 8$) and $M_{2i}$ ($i=1, \ldots, 8$) are provided in multiple connection. A secondary switch stage SSW is composed of the switch matrices $M_{31}$ to $M_{38}$, while a tertiary switch stage TSW is constituted by the switch matrices $M_{41}$ to $M_{58}$. The incoming lines for the speech paths of the switch matrices $M_{4i}$ and $M_{5i}$ are also provided in multiple connection. The individual switch stages are connected to one another so as to form the speech paths through links A and B.

Figure 5:
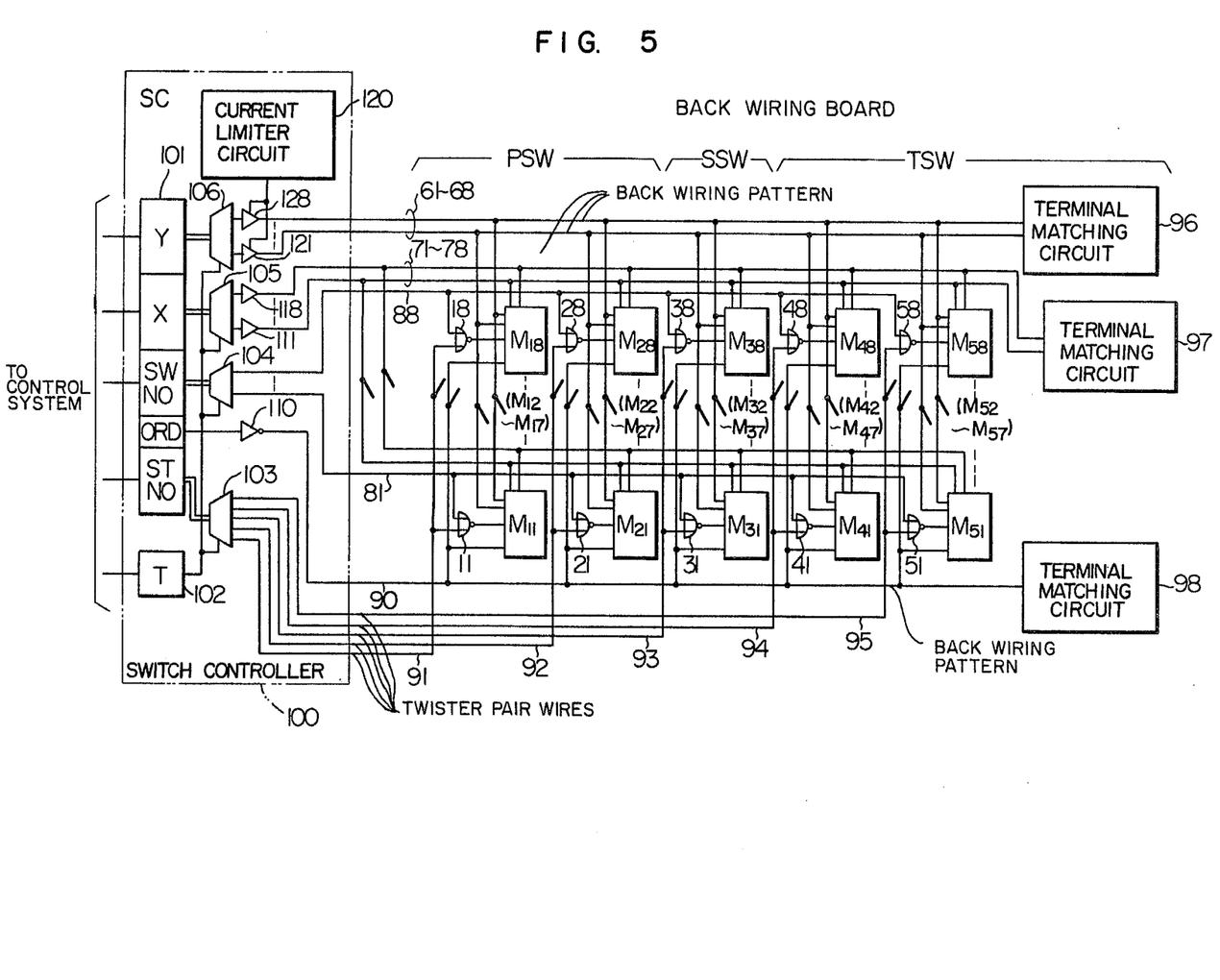
FIG. 5 is a block diagram showing a circuit arrangement of the multi-stage switching network according to an embodiment of the invention.

Next, description will be made on an exemplary system for controlling the operations of the multi-stage switching network shown in FIG. 4 according to the teachings of the invention by referring also to FIG. 5. In FIG. 5, the reference symbols $M_{11}$ to $M_{58}$ denote, respectively, the unitary switch matrices of $8 \times 8$ array shown in FIG. 3, each implemented in a single chip. Each of the cross-point circuits constituting the unitary switch matrix is realized as a switch element having the four input terminals X, Y, SS and DATA as described hereinbefore in conjunction with FIG. 1. By using these unitary switch matrices $M_{11}$ to $M_{58}$, the switching network of the three-stage link connection is realized in such a manner as illustrated in FIG. 4. Referring to FIG. 5, numerals 11 to 58 denote NOR gates, each of which is implemented in the same printed circuit board as that of the associated unitary switch matrix $M_{11}, \ldots, M_{57}$ or $M_{58}$. Reference numerals 61 to 68 denote column control lines for selectively designating or specifying the terminal Y, and 71 to 78 denote row control lines for designating the terminal X. The column and the row control lines are connected to corresponding terminals $Y_1$ to $Y_8$ and $X_1$ to $X_8$, respectively, of all the unitary switch matrices $M_{11}$ to $M_{58}$. For example, the control lines 61 and 71 are provided for forty terminals $Y_1$ and $X_1$, respectively, in multiple connection. Numerals 81 to 88 denote control lines for the signal designating the switch matrix identifying number SWNO, and 91 to 95 denote control signal lines for the signal designating the stage identifying number STNO. For example, the control signal line 81 is connected to an input terminal of five NOR gates 11 to 15 provided correspondingly for the same number of the unitary switch matrices $M_{11}$ to $M_{51}$ arrayed in a row, while the control line 91 is connected to an input of eight NOR gates 11 to 18 each provided for every unitary switch matrices $M_{11}$ to $M_{18}$ arrayed in a column. The other control lines 82 to 88 and 92 to 95 are connected in the similar manner. In other words, each of the NOR gates 11 to 58 has two input terminals each connected to one of the control lines 81 to 88 and one of the control lines 91 to 95 and has an output terminal connected to the terminal SS of the associated one of the unitary switch matrices $M_{11}$ to $M_{58}$. Reference numeral 90 denotes the data control line connected in common to the data terminals DATA of all the unitary switch matrices. Numerals 96, 97 and 98 denote terminal matching circuits for the signal pulses transmitted over the column control lines 61 to 68, the row control lines 71 to 78 and the data control line 90, respectively.

A switch controller (SC)100 is provided which comprises a register 101, a timing circuit 102, decoders 103 to 106, current absorbing circuit 110 and 111 to 118 serving as fan out buffers, a current limiter circuit 120 and current supply circuits 121 to 128. The register 101 has a bit capacity corresponding to the sum of the bit lengths of the matrix column designating signal X, the row designating signal Y, the matrix number designating signal SWNO, the stage number designating signal STNO and the data designating signal ORD for turning on or off the cross-point switches. These signals are supplied from a control unit (not shown) and loaded in the register 101. The timing circuit 102 serves for generating various timing signals required for the operation of the switch controller (SC)100.

Figure 6:
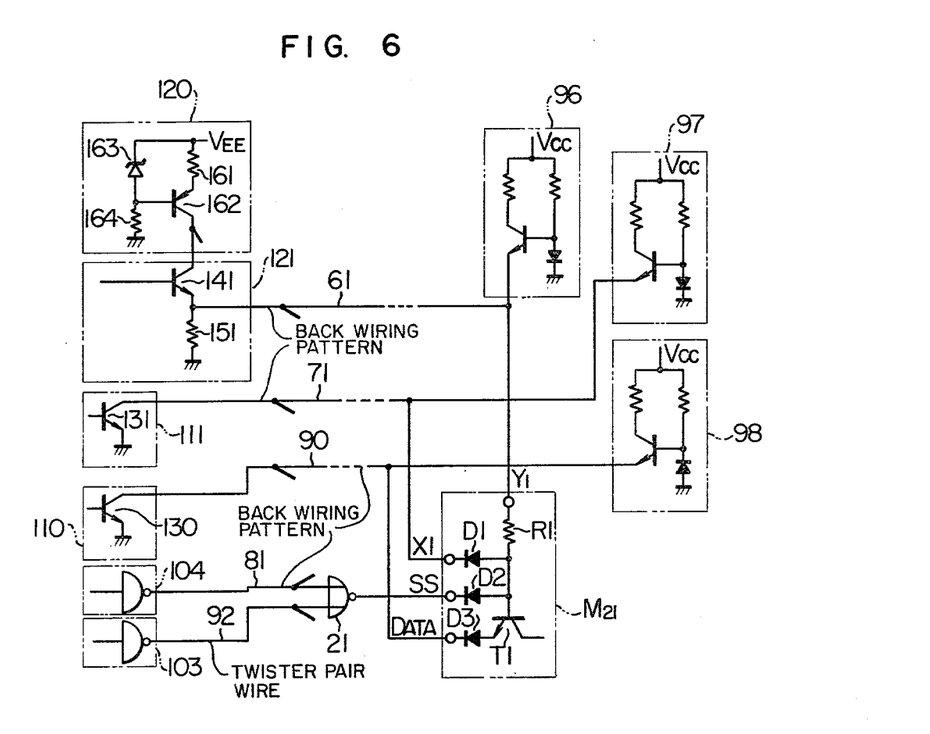
FIG. 6 is a schematic circuit diagram showing a single cross-point circuit in a multi-stage switching network according to the invention.

FIG. 6 shows schematically a driver control circuit for the signal cross-point circuit $XP_{11}$ of the unitary switch matrix $M_{21}$ in the multi-stage switching network shown in FIG. 5. In both figures, the same reference symbols denote same parts. Referring to FIG. 6, decoders 103 and 104 constituted by TTL NAND gates supply the switch matrix selecting or designating signal to the input terminal SS of the unitary switch matrix $M_{21}$ through the control lines 92 and 81 as well as the NOR gate 21. The current absorber circuits 110 and 111 are constituted by transistors 130 and 131 having collectors from which the data designating signal and the unitary matrix row designating signal are supplied to the input terminals DATA and $X_1$ of the unitary switch matrices $M_{11}$ to $M_{58}$ through the control lines 90 and 71, respectively. The current supply circuit 121 is constituted by a resistor 151 and a transistor 141 in an emitter-follower connection and supplies the matrix column designating signal to the input terminals $Y_1$ of the unitary switch matrices $M_{11}$ to $M_{58}$ through the control line 61. The level of the current produced by the current supply circuit 121, which is imparted with a sufficient current supply capacity, is limited to a predetermined value by the current limiter circuit 120 composed of a transistor 162 having an emitter resistor 161 and biased by a bias circuit including a zener diode 163 and a resistor 164, whereby the transistor 141 is protected from damage and/or destruction due to an overcurrent which may be produced upon failure such as the occurrence of short-circuit of the control line 61 to the ground. Each of the terminal circuits 96, 97 and 98 is constituted by a well-known ringing suppression circuit for suppressing the ringing which may be produced at the trailing edge of the driving pulse when the control lines 61, 71 and 90 are excessively long.

Figure 7:
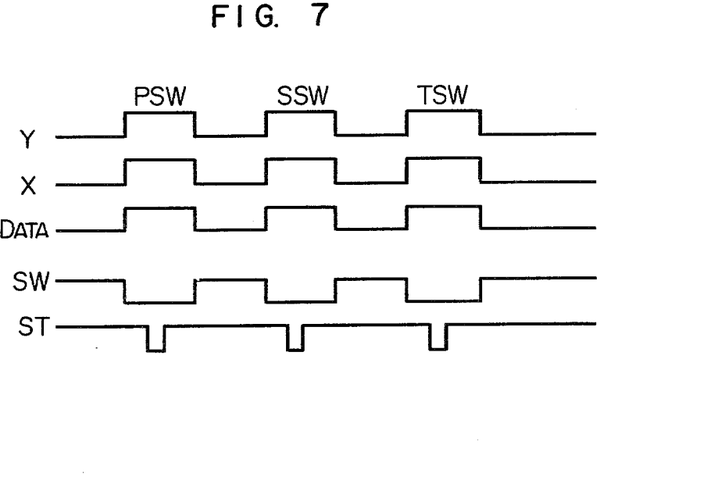
FIG. 7 shows a timing chart for illustrating operation of the multi-stage switching network according to an embodiment of the invention.

FIG. 7 shows timing relations among the control signals transmitted over the various control lines shown in FIG. 5. In FIG. 7, Y represents the pulse current on the control lines 61 to 68, X represents the pulse current on the control lines 71 to 78. DATA represents the pulse current on the control line 90, SW represents the pulse current on the control lines, and ST represents the pulse current on the control lines 91 to 95.

Next, control operations of the multi-stage switching network according to the invention will be described by referring to FIGS. 4 to 7 on the assumption that the speech paths at the incoming and the outgoing sides of the network are connected by closing the cross-point circuit $XP_{11}$ of the unitary switch matrix $M_{21}$ of the primary switching stage PSW, the cross-point circuit $XP_{18}$ of the matrix $M_{31}$ of the secondary stage SSW and the cross-point $XP_{11}$ of the matrix $M_{58}$ belonging to the tertiary switching stage TSW.

Referring to FIG. 5, the command information signals of X (=1), Y (=1), SWNO (=1), STNO (=2) and ORD (=1: closing) required for the control of the primary switching stage PSW are supplied from a control unit (not shown) and stored in the register 101.

The decoder circuits 103 to 106 initiated by the timing circuit 102 produce the driving pulse Y such as shown in FIG. 7 on the column (Y) control line 61 through the associated current supply circuit 121, and the pulse current X (FIG. 7) on the row control line 71 through the associated current absorbing circuit 111, while producing the pulse current SW on the matrix number control line 81 in response to the signal SWNO (=1), the pulse current ST on the stage number control line 90 in response to the signal STNO (=2) and the pulse current DATA shown in FIG. 7 on the data control line 90 through the DATA current absorbing circuit 110.

In more detail, reference is made to FIG. 6. In response to the command signal Y (=1), the transistor 141 of the $Y_1$-current supply circuit 121 is turned on thereby to supply the pulse current Y (FIG. 7) to the terminal $Y_1$ of the matrix $M_{21}$. The $Y_1$ drive pulse will then be applied also to the input terminals Y of the other unitary matrices and thus has to be of a magnitude on the order of 150 mA. Such current supply capacity is easily attainable by constituting the current supply circuit 121 in the emitter-follower configuration as described hereinbefore. On the other hand, the transistors 130 and 131 constituting the current absorbing circuits 110 and 111 which are connected to the terminals DATA and $X_1$, correspondingly and respectively, are turned off, as the result of which the pulse currents DATA and X shown in FIG. 7 are supplied to the terminals DATA and $X_1$ through the control lines 90 and 71, respectively. At the same time, the signals on the control lines 92 and 81 connected to the outputs of the decoders 103 and 104 becomes logic "0" to enable NOR gate 21, whereby the signal of logic "1" is supplied to the terminal SS of the corresponding unitary switch matrix $M_{21}$. Consequently, the current flow path is closed from the power supply source $V_{EE}$ through the resistor 161, transistors 162 and 141, the control line 61, the terminal $Y_1$ and the resistor $R_1$ to the collector of the transistor $T_1$, resulting in that the cross-point switch of the cross-point circuit $XP_{11}$ of the unitary switch matrix $M_{21}$ is closed.

In this connection, it will be noted that the stage number designating current pulse ST is supplied to the NOR gate 21 as a strobe pulse thereby to stabilize the operation and increase the noise margin. In place of the stage number designating signal ST, the switch matrix number designating pulse SW may be utilized to the same effects.

Following to the closing of the one cross-point switch of the primary switch stage PSW described above, the switch controller SC output from the register 101 the information signals of X (=1), Y (=8), SWNO (=1), STNO (=3) and ORD (=1; closing) which are required for the control of the secondary switch stage SSW. As in the case of control of the primary switch stage PSW, the associated decoders 103 to 106 are then started by the timing circuit 102. Thus, the associated current absorber circuit 111 supplies the signal of logic "1" to the row input terminals $X_1$ of the individual unitary switch matrices $M_{11}$ to $M_{58}$ through the row control line 71, while the current supply circuit 128 supplies the signal of logic "1" to the column input terminals Y of the unitary switch matrices $M_{11}$ to $M_{58}$ through the column control line 68. Further, in response to SWNO=1 and STNO=3, the switch matrix number control line 81 and the stage number control line 93 are selected, as the result of which the signal of logic "1" is applied to the chip (unitary switch matrix) selecting terminal SS of $M_{31}$ through the NOR gate 31.

The current absorbing circuit 110 supplies the logic "1" signal to the data input terminals DATA of the individual switch matrices $M_{11}$ to $M_{58}$ through the data control line 90. As a consequence, the cross-point switch of the cross-point circuit $XP_{18}$ in the unitary switch matrix $M_{31}$ is closed.

Following the closing of the cross-point switches at the primary and the secondary switch stages as described above, the switch controller SC produces the information signals of X (=1), Y (=1), SWNO (=8), STNO (=5) and ORD (=1; closing) required for controlling the tertiary switch stage TSW in the similar manner as described above, whereby the cross-point switch of the cross-point circuit $XP_{11}$ in the unitary switch matrix $M_{58}$ is closed.

In this manner, the single switch controller SC can be used in common for controlling the three switch stages by operating the controller SC three times sequentially for the three switch stages on a time-serial base. Further, the arrangement such that the individual control lines X, Y, SW and DATA can be realized in the respective multiple connections at multiple stages leads to a remarkable reduction in the wiring quantity as required. It will be appreciated that the sequential control of the multiple switch stages will not involve substantially any inconvenience such as delay in operation, since the operating time for a single switch stage amounts to no more than several micro-seconds.

Figure 8:
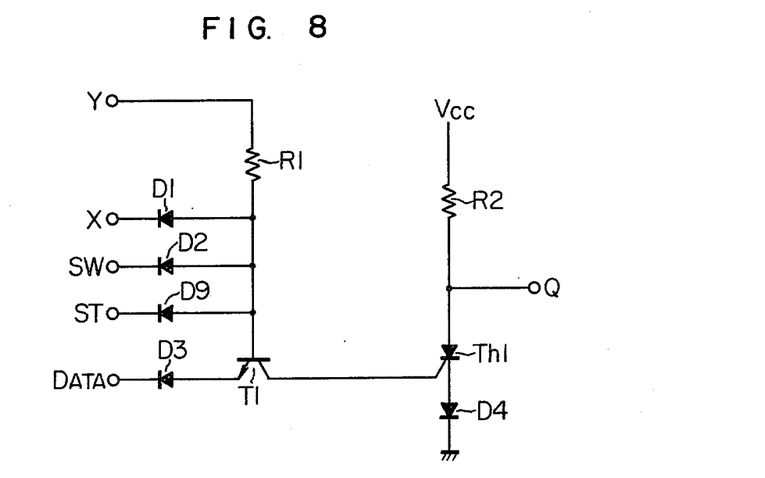
FIG. 8 shows an example of a memory circuit having five logic control inputs which may be used at a single cross-point circuit of the multi-stage switching network according to another embodiment of the invention.

FIG. 8 shows another exemplary circuit arrangement of the memory circuit which may be applied to the individual cross-point circuits of the multi-stage switching network according to the invention. The memory circuit shown in FIG. 8 differs from the one shown in FIG. 1 in that the unitary switch matrix selecting terminal SS is divided into the switch matrix number selecting terminal SW and the stage number selecting terminal ST. Thus, the memory circuit shown in FIG. 8 has five logical input terminals in total. This arrangement of the memory circuit allows the associated NOR gate (11 to 58 in FIG. 5) of the unitary switch matrix ($M_{11}$ to $M_{58}$) to be omitted. Further, various arrangements of the control input circuit for the memory circuit may easily occur to those skilled in the art. For example, when the base current is supplied to the transistor $T_1$ in dependence on two or more information signals, the base of the transistor $T_1$ may be connected to the input terminals for these information signals through other transistors. In this case, however, arrangement should be made such that the base current is supplied as a function of the logical product of the input information signals.

The present invention brings about the following advantages:

(1) By virtue of such arrangement that the terminals X, Y, SS and DATA are provided as the control input terminals for each of the cross-point circuit as shown in FIG. 1 thereby to allow any given cross-point switch in the switch matrix to be selected in dependence on the input terminal state, the number of the gate circuits required corresponding for each of the cross-point circuit can be significantly reduced. In the case of the embodiment illustrated in FIGS. 1 to 7, only a single NOR circuit for the switch matrix number control line and the switch stage number control line for each of the unitary switch matrices.

Besides, when the input terminals X, Y, SW, ST and DATA are provided as is in the case of the embodiment shown in FIG. 8, the selection of the switch stage and the switch matrix is effected at the individual cross-point without requiring any separate or additional gate circuit, allowing the switch matrix to be implemented only by the switching elements to an advantage.

(2) Because a plurality of the switch stages are sequentially controlled by the single common controller (SC), the amount of hardware for designating X, Y, SWNO and ORD (DATA) is reduced to a fraction of the stage number, which of course means economization in the manufacture of the switching network. Further, since the control lines for X (row), Y (column) and DATA (data) input signals are provided in common to all the switch matrices in multiple connection while the control lines SWNO are provided in common for all the switch stages also in multiple connection, the wiring for these control lines can be easily effected on a back-wiring board at one end of which the switch controller SC is packed, thereby to reduce significantly the number of the manufacturing steps.

(3) By virtue of the multiple connections adopted in the whole switching network as described above, the emitter-follower circuit of a simplified structure, which is nevertheless capable of withstanding a high load, can be used for driving the column (Y) control lines, while a general purpose IC current absorbing circuit can be used to drive the DATA control lines, whereby the amount of required hardware can be significantly reduced. If TTL's are to be used in the circuit shown in FIG. 5, eight TTL's will be required for a single emitter-follower circuit.

(4) Because the selection of a cross-point in the switch matrix is effected as a function of at least three different terms, the circuit is immune to erroneous operation due to noise or spurious signals. When twister-pair wires are used as the five stage control lines which are destined to serve for supplying the strobe pulse, the noise immunity characteristic of the whole network may be further enhanced. Wiring by using the back-wiring board is also effective for enhancing the noise immunity.

It will be appreciated that the invention has now provided a system for driving a multi-stage switching network which is excellent in the stability of operation and can be manufactured inexpensibly with a minimum number of additional hardware at a reduced number of wiring steps.

We claim:

1. A multi-stage switching network including switch matrices which are comprised of rows and columns comprising:

(a) a plurality of unitary switch matrices arranged in a matrix array in which each stage of said multi-stage switching network is constiuted by a predetermined number of said unitary switch matrices constituting at least one column of said matrix array, each of said unitary switch matrices including a predetermined number of cross-point circuits arranged in a matrix array having a predetermined number of rows and columns, each of said cross-point circuits including a memory circuit constituted by a storage cell having bistable states and a control input circuit having at least three logic input terminals and adapted to control the state of said storage cell in dependence on drive signals supplied to said three input terminals and further including cross-point speech path means adapted to be opened or closed in dependence on the state of said storage cell, the first input terminals of said cross-point circuits belonging to one of the corresponding rows of each of said unitary switch matrices being connected to one of first common lines, and the second input terminals of said cross-point circuits belonging to one of the corresponding columns of each of said unitary switch matrices being connected to one of second common lines, and the third input terminals of all the cross-point circuits of each of said unitary switch matrices being connected to a third common line;

(b) first control means connected with said first common lines for selectively supplying a first drive signal to one of said first common lines;

(c) second control means connected with said second common lines for selectively supplying a second drive signal to one of said common lines;

(d) third control means for selectively supplying a third drive signal to one of said third common lines of said unitary switch matrices of said each stage;

(e) fourth control means for selectively supplying a fourth drive signal to all said third common lines of said unitary switch matrices of one of said stages on a time-serial base, thereby to cause the opening or closing control of the cross-point speech path means of one of said cross-point circuits of said each stage on a time-serial base.

2. A multi-stage switching network including matrices which are comprised of rows and columns comprising:

(a) a plurality of stages each having at least one column of a plurality of unitary switch matrices, each of said unitary switch matrices including a predetermined number of cross-point circuits arranged in rows and columns to form a matrix array therewith, each of said cross-point circuits having (i) cross-point speech path means which includes a pair of mutually inverse parallel connected thyristors and through which a cross-point speech path is formed, (ii) a constant current supply source for operating constant current to said thyristors, (iii) a storage cell having bistable states for operatively allowing said constant current supply source to supply the constant current to said thyristors when the storage cell has one of the bistable states thereof, and (iv) a control input circuit including a switching element having at least three logic input terminals and an output terminal connected to said storage cell, said switching element being rendered operative only when three logical input signals are concurrently supplied to said three input terminals so as to render said storage cell into said one stable state, said three logical input signals being a first and second input information signals designating respectively the row and column of the cross-point circuit in each matrix array, and a third input information signal designating each one of the unitary switch matrices in the switching network, a first one of the three logic input terminals of each cross-point circuit in each unitary switch matrix to which said first input signal is to be supplied being connected in common to first one input terminals of the other cross-point circuits positioned in the same row in the respective unitary switch matrices so as to form a plurality of groups of the first one input terminals of the same row positioning cross-point circuits, a second one of the three logic input terminals of each cross-point circuit in each unitary switch matrix to which said second input signal is to be supplied being connected in common to second one input terminals of the other cross-point circuits positioned in the same column in the respective unitary switch matrices so as to form a plurality of groups of the second one input terminals of the same column positioning cross-point circuits and third ones of the three logic input terminals of the respective cross-point circuits in each unitary switch matrix being connected together in matrix manner;

(b) first control means for operatively providing the first input information signal which selectively designates one of the rows of the cross-point circuits in each unitary switch matrix to a corresponding one group of the first one input terminals of the same row positioning cross-point circuits whose row is designated by said first input information signal;

(c) second control means for operatively providing the second input information signal which selectively designates one of the columns of the cross-point circuits in each unitary switch matrix to a corresponding one group of the second one input terminals of the same column positioning cross-point circuits whose column is designated by said second one input signal;

(d) third control means for operatively providing the third input information signal which selectively designates one of the unitary switch matrices to commonly connected third ones of the three logic input terminals of the cross-point circuits of the thus selected one unitary switch matrix; and (e) timing control means for rendering time-serially said first, second and third control means operative in synchronism with each other.

3. A multi-stage switching network including switch matrices comprised of rows and columns comprising:

(a) a plurality of stages arranged in series to operatively form a communication path therethrough, each stage including at least one column of the unitary switch matrices of a predetermined number, each of said unitary switch matrices including a predetermined number of cross-point circuits arranged in rows and columns to form a matrix array therewith, each of said cross-point circuits including a memory circuit, a control circuit and cross-point speech path means, said memory circuit including a storage cell having bistable states for rendering said cross-point speech path means to open or close in dependence on the states of said storage cell and a control input circuit having at least three logic input terminals for controlling the states of said storage cell in dependence on input information signals supplied to said input terminals;

(b) first control means for selectively supplying one of respective row designating signals which respectively designate the respective rows of the cross-point circuits in the unitary switch matrix to corresponding ones of the cross-point circuits belonging to the thus designated row in all of the unitary switch matrices at a first input terminal of the three logic input terminals of each said corresponding cross-point circuit as the input information signal therefor;

(c) second control means for selectively supplying one of respective column designating signals which respectively designate the respective columns of the cross-point circuits in the unitary switch matrix to corresponding ones of the cross-point circuits belonging to the thus designated column in all of the unitary switch matrices at a second input terminal of the three logic input terminals of each said corresponding cross-point circuit as the input information signal therefor;

(d) third control means for selectively supplying one of respective matrix designating signals which respectively designate respective row positions of the unitary switch matrices in each column therewith to corresponding ones of the unitary switch matrices belonging to the thus designated row position in all the stages at a third input terminal of the three logic input terminals of each said cross-point circuits in each said corresponding unitary switch matrix as the input information signal therefor; and (e) fourth control means for selectively time-serially supplying a stage designating information signal which designates one of the plurality of stages to all the corresponding unitary switch matrices belonging to the thus designated one stage so as to select only one unitary switch matrix belonging to both the thus designated one stage and the thus designated row position, thereby to cause one cross-point circuit for each stage in closed state on a time-serial base, which closed state is maintained by the corresponding storage cell, so as to complete the communication path of the multi-stage switching network.

4. A multi-stage switching network as set forth in claims 1, 2 or 3, wherein said control input circuit comprises at least a transistor which has a collector connected to said storage cell, an emitter connected to one of said input terminals and a base operatively connected to at least two others of said input terminals, whereby a base current is supplied to said transistor as a function of a logical product of at least two drive signals supplied to said at least two others of said input terminals, respectively.

5. A multi-stage switching network as set forth in claim 1, wherein one of said two other input terminals operatively connected to the base of said transistor is supplied with the logical product of said third and fourth drive signals.

6. A multi-stage switching network as set forth in claim 1, wherein the base of said transistor is operatively connected to at least three input terminals, two of said input terminals being supplied with said third and fourth drive signals, respectively.

7. A multi-stage switching network as set forth in claim 6, wherein said storage cell is constituted by a semiconductor switch element of a four-layered PNPN semiconductor structure, a control gate of said semiconductor switch element being connected to the collector of said transistor of said input control circuit.

8. A multi-stage switching network as set forth in claims 1, 2 or 3, wherein said control input circuit of the memory circuit of each of said cross-point circuits comprises a fourth input terminal and at least a transistor having a collector connected to said storage cell and a base operatively connected to said first, second and third input terminals, and adapted to be supplied with a base current as a function of a logical product of the first, second and third drive signals while an emitter of said transistor is connected to said fourth input terminal, further comprising fifth control means for transmitting a data information signal in common to said fourth input terminals of the cross-point circuits of all of said unitary switch matrices.

9. A multi-stage switching network as set forth in claims 1, 2 or 3, wherein an emitter-follower circuit is used for a selected one of said first and second control means.

10. A multi-stage switching network as set forth in claim 9, wherein a power supply source for said emitter-follower circuits includes means for limiting an output current therefrom.

11. A multi-stage switching network as set forth in claims 1, 2 or 3, wherein said first and second control means are provided at one end of said plurality of unitary switch matrices having other ends at which terminal circuits are provided for the control lines for transmitting said first and second drive signals.

12. A multi-stage switching network as set forth in claims 1, 2, and 3, wherein a selected one of said third and fourth control means is adapted to transmit a strobe signal.

13. A multi-stage switching network as set forth in claim 12, wherein twister-pair wires are used as control lines for transmitting said strobe signal.

14. A multi-stage switching network as set forth in claims 1, 2 or 3, wherein the control lines for transmitting said drive signals from said first and second control means are wired on a backwiring board.

15. A multi-stage switching network including switch matrices which are comprised of rows and columns comprising:
(a) a plurality of unitary switch matrices arranged in a matrix array in which each stage of said multi-stage switching network is constituted by a predetermined number of said unitary switch matrices constituting at least one column of said matrix array, each of said unitary switch matrices including a predetermined number of cross-point circuits arranged in a matrix array having a predetermined number of rows and columns, each of said cross-point circuits including a memory circuit constituted by a storage cell having bistable states and a control input circuit having at least four logic input terminals and adapted to control the state of said storage cell in dependence on drive signals supplied to said four input terminals and further including cross-point speech path means adapted to be opened or closed in dependence on the state of said storage cell, the first input terminals of said cross-point circuits belonging to one of the corresponding rows of each of said unitary switch matrices being connected to one of first common lines, and the second input terminals of said cross-point circuits belonging to one of the corresponding columns of each of said unitary switch matrices being connected to one of second common lines, and the third input terminals of all the cross-point circuits of each of said unitary switch matrices being connected to a third common line;
(b) first control means connected with said first common lines for selectively supplying a first drive signal to one of said first common lines;
(c) second control means connected with said second common lines for selectively supplying a second drive signal to one of said second common lines;
(d) third control means for selectively supplying a third drive signal to one of said common lines to select a switch matrix in accordance with a matrix number;
(e) fourth control means for selectively supplying a fourth drive signal to one of said common lines to select a matrix stage in accordance with a matrix stage number;
(f) fifth control means for selectively supplying a fifth drive signal to all said third common lines of said unitary switch matrices of one of said stages on a time-serial base, thereby to cause the opening or closing control of the cross-point speech path means of one of said cross-point circuits of said each stage on a time-serial base.

* * * * *